2,941,920

PESTICIDAL PHOSPHORUS ESTERS

Joe R. Willard and John F. Henahan, Middleport, N.Y., assignors to Food Machinery and Chemical Corporation, New York, N.Y., a corporation of Delaware No Drawing. Filed Apr. 22, 1957, Ser. No. 654,065

15 Claims. (Cl. 167—22)

This invention relates to new and useful derivatives of methylene bisdithiophosphates, and to pesticidal compositions containing the same.

The compounds of this invention have the general formula

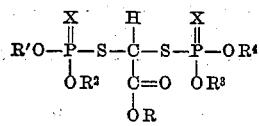

wherein R, R', R², R³ and R⁴ are the same or different organic radicals, and X is oxygen or sulfur. These bis-dithiophosphates have acaricidal, insecticidal, fungicidal and nematocidal properties. Although activity varies among different members of the class, in general these compounds are highly toxic towards a large variety of pests. In pesticidal compositions exhibiting most marked activity at low concentrations, those compounds wherein R', R², R³ and R⁴ are lower alkyl radicals, and X is sulfur, are preferred.

The compounds of this invention may be prepared by reacting a dihaloacetic ester with a salt of the appropriate phosphorothioic or phosphorodithioic acid diester. The halogen atoms of the dihaloacetic ester may both be the same, such as chlorine or bromine. If it is desired to prepare, in a two-step reaction, a compound wherein R³ and R⁴ are different from R' and R², the reaction may be facilitated by using a chlorobromoacetic ester as reactant. In addition, mixtures of phosphorous diesters may be used to obtain a desired combination of radicals in the final product.

The alcoholic component of the dihaloacetic ester may be derived from an aliphatic alcohol or a phenol. For example, the radical R may be saturated or unsaturated alkyl, cycloalkyl, aralkyl, part of a heterocyclic ring system, and substituted derivatives thereof, including, for example, radicals such as methyl, ethyl, isopropyl, sec.-butyl, cyclohexyl, 2-ethylhexyl, n-octyl, benzyl, phenylethyl, carboxymethyl, pentamethylene, ethyleneoxyethylene, and the like. The R group may also be aryl, such as phenyl or substituted phenyl, including such derivatives as chlorophenyl, nitrophenyl, methoxyphenyl, biphenyl and the like. R may also be hydrogen, in which case the reagent is a dihaloacetic acid.

The phosphorothioic or phosphorodithioic acid diester used in this reaction is preferably reacted as a salt, such as the alkali metal and alkaline earth salts and the ammonium and silver salts. The phosphorus acid diester itself may be prepared by methods known in the art. For instance, a diester of dithiophosphoric acid may be prepared by reacting an alcohol or a mixture of alcohols with phosphorus pentasulfide. Depending on the alcohols used, the esterifying groups may be any organic radical or mixtures thereof.

In the preferred process of this invention two molar equivalents of the appropriate phosphorothioic or phosphorodithioic acid is dissolved in a solvent such as ethanol or dioxane, and a solution of the metal hydroxide is added until the pH is about seven. A 25–40% solution of potassium hydroxide in ethanol is a convenient reagent. A preformed salt of the phosphorus acid may also be used, dissolved in a solvent. To the neutral solution is added one molar equivalent of the desired dihaloacetic ester, and the mixture is heated until the reaction is complete. This generally requires about 4–14 hours under reflux. The product is then separated and tested for pesticidal activity.

This class of compounds is characterized by a broad scope of pesticidal activity, including insecticidal, fungicidal, acaricidal, ovicidal, and nematocidal properties. This unusually broad range of activity appears to be a general characteristic of this class of compounds, some of which of course show higher toxicity and greater specificity than others.

These compounds are made into pesticidal compositions by formulation as aqueous emulsions, as dry or wettable powders, as solutions or in any other suitable vehicle. The compositions can be utilized as sprays, as dusts, as aerosol mixtures, as insecticidal coating compositions, and as residues. In general, they can be applied by methods commonly used for the control or eradication of insects, mites and the like. Thus, these compositions may be formulated with solvents, diluents, carrier media, adhesives, spreading, wetting and emulsifying agents and other ingredients. These compounds may be used as the sole toxic ingredient in pesticidal fomulations, or in combination with other toxicants or synergists for specific applications.

The toxicants of this invention may be employed in controlling many types of pests, including insects, arachnids, nematodes and fungi, such as, for example, the German roach (*Blattela germanica* (L.)), Mexican bean beetle (*Epilachnia varivestis* (Muls.)), southern army worm (*Prodenia eridania* (Cram.)), pea aphid (*Macrosiphum pisi* (Kltb.)), two-spotted spider mite (*Tetranychus bimaculatus* (H.)), bean rust (*Uromyces appendiculatus*), cucumber anthracnose (*Colletotrichum lagenarium*), early blight of tomato (*Alternaria solani*), late blight of tomato (*Phytophthora infestans*), the rootknot nematode (*Meloidogyne incognita*), and the like. Standard test methods are used for measuring the activity of these toxicants.

A typical formulation used to evaluate the toxicants of this invention is a wettable powder containing 25% of the candidate pesticide, 72% Attaclay (fuller's earth) and 3% of an alkyl aryl polether alcohol as wetting agent. In routine testing, this wettable powder is applied to plant foliage by applying as an aqueous dispersion, at a dilution of 1250 parts of toxicant per million parts of dispersion.

The following examples illustrate the preparation and pesticidal behavior of typical compounds of this invention. All parts are by weight.

Example 1

To an ethanolic solution of 37.2 parts of O,O-diethyl hydrogen phosphorodithioate was added 25% ethanolic potassium hydroxide slowly to a pH of 6.0–6.5, maintaining the temperature below 50° C. during the addition. To this solution of potassium O,O-diethylphosphorodithioate was added 24.6 parts of ethyl dibromoacetate. The mixture was heated under reflux for two and one half hours. After filtering off the precipitated potassium bromide the filtered mixture was concentrated under reduced pressure. An equal volume of diethyl ether was added, and the solution was dried over sodium sulfate. Removal of the ether from the dried solution yielded 40.5 parts of bis(S-(diethoxyphosphinothioyl)

mercapto) carbethoxymethane having a refractive index $n_D^{25}=1.5123$. *Analysis.*—Calcd. for $C_{12}H_{26}O_6P_2S_4$: P=13.57, S=28.09. Found: P=13.32, S=29.08.

This compound was formulated for pesticidal testing by preparing a wettable powder concentrate containing 25.0% of the compound, 3% of an alkyl aryl polyether alcohol and 72.0% Attaclay. Applied as an aqueous emulsion containing the toxicant at a concentration of 1250 p.p.m., this formulation exhibited 100% kill of the German roach, 100% kill of the Mexican bean beetle, and 100% kill of the southern army worm.

*Example 2*

Bis(S - (diethoxyphosphinothioyl)mercapto)carboxymethane was prepared from O,O-diethyl hydrogen phosphorodithioate and dichloroacetic acid, following the procedure of Example 1. The product was an oil having an $n_D^{25}=1.5195$. When formulated as in Example 1 and applied at a concentration of 1250 p.p.m., this compound exhibited a fungicidal activity of 92% control of early blight (*A. solani*) and 99% control of late blight (*P. infestans*).

*Example 3*

Bis(S - (diethoxyphosphinothioyl)mercapto)carbomethoxymethane was prepared from O,O-diethyl hydrogen phosphorodithioate and methyl dichloroacetate, following the procedure of Example 1. The product was an oil having $n_D^{25}=1.5012$. When formulated as in Example 1 and applied at a concentration of 1250 p.p.m., this compound exhibited 100% kill of the two-spotted spider mite and 80% kill of the Mexican bean beetle.

*Example 4*

Bis(S - (diethoxyphosphinothioyl)mercapto)(carbo-1-butoxy)methane was prepared from O,O-diethyl ammonium phosphorodithioate and n-butyl dichloroacetate in 90% yield, following the general procedure of Example 1. The product was a red-brown liquid having a refractive index $n_D^{25}=1.4848$. When formulated as in Example 1 and applied at a concentration of 1250 p.p.m., this compound exhibited complete control of adult and nymphal stages of two-spotted mites.

*Example 5*

Bis(S - (diethoxyphosphinothioyl)mercapto)carbo - (4-chlorophenoxy)methane was prepared from O,O-diethyl ammonium phosphorodithioate and 4-chlorophenyl dichloroacetate in 80% yield, following the general procedure of Example 1. The product was a brown liquid having a refractive index $n_D^{25}=1.5395$. When formulated as in Example 1 and applied at a concentration of 1250 p.p.m., this compound exhibited 89% kill of adult two-spotted spider mites.

*Example 6*

Bis(S-(di - 2 - propoxyphosphinothioyl)mercapto)carbethoxymethane was prepared in 78% yield from O,O-di-2-propyl hydrogen phosphorodithioate and ethyl dichloroacetate, following the procedure of Example 1. The product was an oil having a refractive index $n_D^{25}=1.4993$. When formulated as in Example 1 and applied at a concentration of 1250 p.p.m., this compound exhibited complete control of adult and nymphal stages of two-spotted mites.

*Example 7*

Bis(S - (dimethoxyphosphinothioyl)mercapto)carbethoxymethane was prepared in 95% yield from O,O-dimethyl hydrogen phosphorodithioate and ethyl dichloroacetate, following the procedure of Example 1. The product was an oil having a refractive index $n_D^{25}=1.5303$. When formulated as in Example 1 and applied at a concentration of 1250 p.p.m., this compound exhibited 97% control of the two-spotted spider mite.

This application is a continuation-in-part of copending application Serial No. 597,886, filed July 16, 1957, now U.S. Patent No. 2,873,228.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. As a new composition of matter a compound of the formula

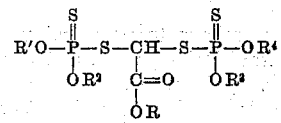

wherein R, R', $R^2$, $R^3$ and $R^4$ each represents an alkyl radical of 1–4 carbon atoms.

2. As a new composition of matter a compound of the formula

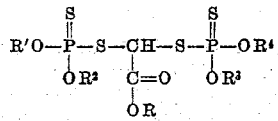

wherein R', $R^2$, $R^3$ and $R^4$ each represents an alkyl radical of 1–4 carbon atoms and R is hydrogen.

3. As a new composition of matter a compound of the formula

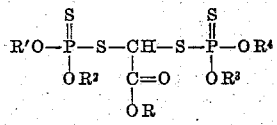

wherein R', $R^2$, $R^3$ and $R^4$ each represents an alkyl radical of 1–4 carbon atoms and R is chlorophenyl.

4. As a new composition of matter a compound of the formula

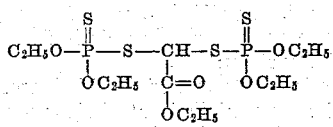

5. As a new composition of matter a compound of the formula

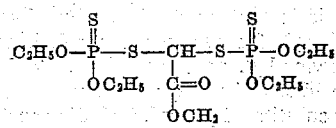

6. As a new composition of matter a compound of the formula

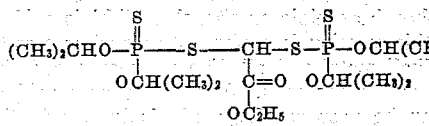

7. As a new composition of matter a compound of the formula

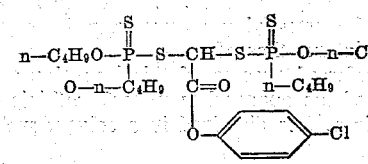

8. As a new composition of matter a compound of the formula

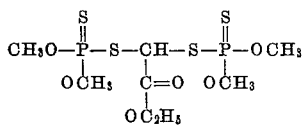

9. A pesticidal composition comprising the compound of claim 15 and an inert pesticidal adjuvant therefor.

10. A pesticidal composition comprising the compound of claim 1 and an inert pesticidal adjuvant therefor.

11. A method for controlling pests comprising contacting said pests with an effective concentration of a compound of claim 15.

12. A method for controlling pests comprising contacting said pests with an effective concentration of a compound of claim 1.

13. A method for controlling pests comprising contacting said pests with an effective concentration of a compound of claim 2.

14. A method for controlling pests comprising contacting said pests with an effective concentration of a compound of claim 3.

15. As a new composition of matter a compound of the formula:

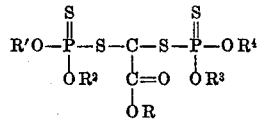

wherein $R'$, $R^2$, $R^3$ and $R^4$ each represent a lower alkyl radical and R is selected from the group consisting of hydrogen, lower alkyl radicals, phenyl and chlorophenyl radicals.

References Cited in the file of this patent
UNITED STATES PATENTS 2,645,657    Rudel et al. _____ July 14, 1953

FOREIGN PATENTS 1,133,785    France _____ Nov. 19, 1956

UNITED STATES PATENT OFFICE

CERTIFICATE OF CORRECTION

Patent No. 2,941,920 June 21, 1960

Joe R. Willard et al.

It is hereby certified that error appears in the printed specification of the above numbered patent requiring correction and that the said Letters Patent should read as corrected below.

Column 2, line 29, for "fomulations" read -- formulations --; line 49, for "polether" read -- polyether --; column 4, lines 55 to 58, the center portion of the formula should appear as shown below instead of as in the patent:

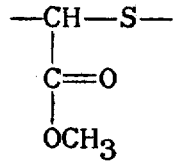

column 6, lines 7 and 8, the center portion of the formula should appear as shown below instead of as in the patent:

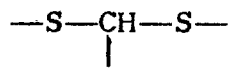

Signed and sealed this 31st day of January 1961.

SEAL)
Attest:

ARL H. AXLINE
Attesting Officer

ROBERT C. WATSON
Commissioner of Patents